United States Patent
Hubbard, Jr.

(10) Patent No.: US 9,554,554 B2
(45) Date of Patent: Jan. 31, 2017

(54) AUTO AND TRUCK PET CHIN-REST

(71) Applicant: Harold P. Hubbard, Jr., El Cerrito, CA (US)

(72) Inventor: Harold P. Hubbard, Jr., El Cerrito, CA (US)

(73) Assignee: Hubbard Pet Helper Products, LLC, El Cerrito, CA (US)

(*) Notice: Subject to any disclaimer, the term of this patent is extended or adjusted under 35 U.S.C. 154(b) by 0 days.

(21) Appl. No.: 14/880,102

(22) Filed: Oct. 9, 2015

(65) Prior Publication Data

US 2016/0100549 A1    Apr. 14, 2016

Related U.S. Application Data (60) Provisional application No. 62/122,102, filed on Oct. 10, 2014.

(51) Int. Cl.
*B60J 1/20* (2006.01)
*A01K 1/035* (2006.01)

(52) U.S. Cl.
CPC ..................... *A01K 1/035* (2013.01)

(58) Field of Classification Search
CPC .... A47D 13/083; A47D 13/08; A47C 31/105; A47G 9/0253; A47G 9/10; D07B 2801/18; A01K 1/0272; A01K 1/04; A01K 27/002; A01K 27/003
USPC ........................................................ 296/152
See application file for complete search history.

(56) References Cited

U.S. PATENT DOCUMENTS

| | | | | |
|---|---|---|---|---|
| 798,683 A * | 9/1905 | Ketteman | ............... | A47L 3/02 182/61 |
| 1,756,694 A * | 4/1930 | Loehr | ............... | B60N 2/4666 248/118 |
| 2,670,235 A * | 2/1954 | Susil | ............... | B60N 2/4666 16/225 |
| 2,711,344 A * | 6/1955 | Larson | ............... | B60N 2/4666 296/153 |
| 2,738,220 A * | 3/1956 | Simmons | ............... | B60N 2/4666 296/153 |
| 4,605,260 A * | 8/1986 | Sakakibara | ............... | B60J 1/14 296/146.2 |
| 4,860,689 A * | 8/1989 | Stewart | ............... | A01K 1/0353 119/28.5 |
| 4,869,451 A * | 9/1989 | Gordon | ............... | A47H 27/00 248/235 |
| 4,951,998 A * | 8/1990 | McClain | ............... | B60N 2/4879 248/118 |
| 5,004,292 A * | 4/1991 | Horne | ............... | B60J 10/75 248/118 |
| 5,216,772 A * | 6/1993 | Clute | ............... | A47D 13/08 5/630 |

(Continued)

*Primary Examiner* — Kiran B Patel
(74) *Attorney, Agent, or Firm* — Manatt, Phelps & Phillips, LLP (57) ABSTRACT

An auto and truck window pillow comprising a fabric sleeve defining a cavity, the fabric sleeve comprising a first face comprising a planar fabric protruding perpendicular to the first face and parallel to a long axis of the cavity and a second face comprising an opening parallel to the long axis of the cavity, filler material positioned within the cavity, and a first fastener comprising a track body adapted to attach to an auto or truck window and the planar fabric, whereby a dog can rest its chin on the window pillow.

10 Claims, 7 Drawing Sheets

(56) References Cited

U.S. PATENT DOCUMENTS

| | | | | |
|---|---|---|---|---|
| 5,934,754 | A * | 8/1999 | Raffa | B60N 2/24 |
| | | | | 297/220 |
| 6,340,169 | B1 * | 1/2002 | Tietze | B60R 21/213 |
| | | | | 280/728.2 |
| 6,840,566 | B2 * | 1/2005 | Bruton | B60N 2/4666 |
| | | | | 296/153 |
| 6,926,341 | B1 * | 8/2005 | Addesso | B60R 11/00 |
| | | | | 119/712 |
| 7,445,270 | B2 * | 11/2008 | Wakou | B60R 21/0428 |
| | | | | 296/146.7 |
| 7,484,809 | B2 * | 2/2009 | Hughes | B60N 2/464 |
| | | | | 296/153 |
| 8,221,662 | B2 * | 7/2012 | Kaufmann | B29C 44/0446 |
| | | | | 264/45.5 |
| 9,179,794 | B2 * | 11/2015 | Darby | A47H 27/00 |
| 2007/0138831 | A1 * | 6/2007 | Carter | B60J 11/025 |
| | | | | 296/152 |
| 2012/0260430 | A1 * | 10/2012 | Hernandez | A47D 13/083 |
| | | | | 5/655 |
| 2013/0074269 | A1 * | 3/2013 | Phillips, II | A47C 20/021 |
| | | | | 5/648 |
| 2013/0119716 | A1 * | 5/2013 | Stronconi | B60N 2/4805 |
| | | | | 297/180.1 |

* cited by examiner

AUTO AND TRUCK PET CHIN-REST

RELATED APPLICATION

This application claims the benefit, under 35 U.S.C. §119(e), of U.S. Provisional Patent Application No. 62/122, 102, filed Oct. 10, 2014, which is incorporated herein by reference in its entirety for all purposes.

TECHNICAL FIELD

This disclosure generally relates to pet comfort products and more specifically relates to pet window cushions.

BACKGROUND

Pet ownership has been on the rise in the United States for the past two decades. There is an increasing demand for specialized products for pets, including dogs, ranging from diets, supplements, to comfort pet products and pet services. Pet owners are continuously looking for ways to pamper their pets, such as with pet furniture, pet beds, pet strollers, pet clothes, and other types of pet comfort products. Pet comfort products make pets happier, healthier, and more secure.

DESCRIPTION OF EXAMPLE EMBODIMENTS

A chin-up pup auto and truck pet chin-rest is a lightweight, washable, durable pillow that snaps onto auto and truck windows for pets, such as dogs, to use as a chin-rest. Many loving pet owners bring their dogs with them in their cars. When they are away for two or more nights, 32% of dog owners take their pets with them in their car. Riding in cars can be stressful and uncomfortable for dogs. A window pillow, such as the chin-up pup, may provide an additional comfort for dogs riding in cars that like to put their heads out the window and rest their heads on the window and top of the door from which the window extends. Particular embodiments of the chin-up pup may relieve pressure and stress to pets' chin and jaw underside. Particular embodiments of the chin-up pup are a first of its kind pet window comfort pillow, with exclusive non-scratch, non-abrasive, snap-on locking technology and a secondary safety.

Figure 1:
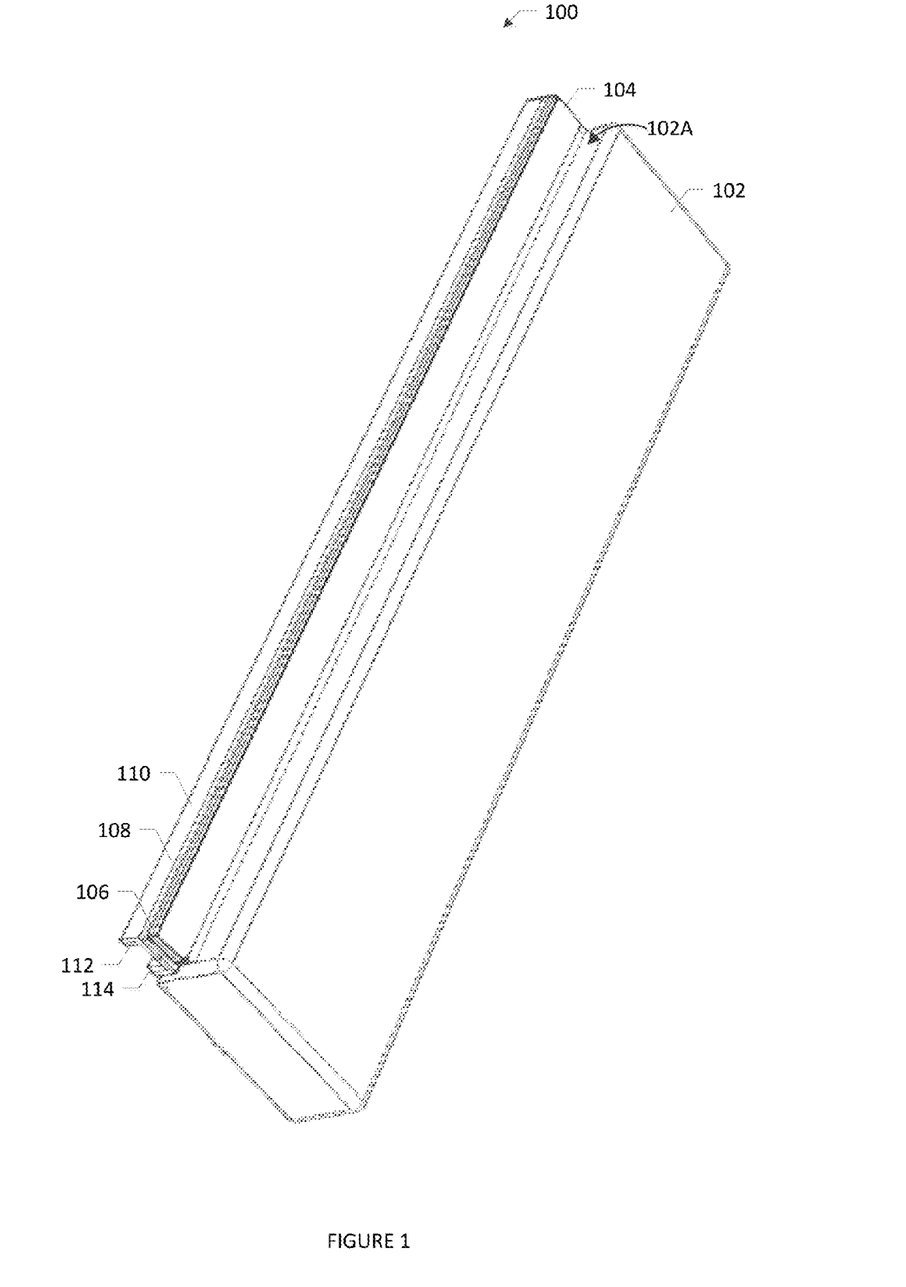
FIG. 1 illustrates a top angle view of an example embodiment of an auto and truck pet chin-rest.

FIG. 1 illustrates a top angle view of an example embodiment of an auto and truck pet chin-rest. In particular embodiments, chin-rest 100 may be rectangular in shape. In particular embodiments, a chin-rest 100 may be approximately 12 inches long, 3 inches wide, and 1 inch thick. In particular embodiments, a chin-rest 100 may be greater or less than 12 inches long, or customized to be the approximate length of an entire window opening of a particular automobile or a truck window. In particular embodiments, a chin-rest 100 may be greater or less than 3 inches wide, or customized to be the approximate width of a window ledge of a particular automobile or truck window. In particular embodiments, a chin-rest 100 may be greater or less than 1 inch thick, depending on the type of fill material, the density of the fill material, or the desired thickness of the chin-rest 100 for a particular dog in a particular automobile or truck window.

Particular embodiments of chin-rest 100 comprise a fabric sleeve 102 defining a rectangular cavity. Fabric sleeve 102 may be any kind of suitable material. Fabric sleeve 102 may be a stain-resistant, lightweight, washable, UV-resistant, or non-shrink material, or any combination thereof. In particular embodiments, fabric sleeve 102 may comprise 100% cotton, a cotton blend, denim, nylon, polyester, fleece, plastic, Gore-Tex®, suede, or leather. In particular embodiments, fabric sleeve 102 may match an interior of a particular automobile or truck. In particular embodiments, fabric sleeve 102 may have a designer pattern or fanciful design that does not match an interior of any particular automobile or truck. In particular embodiments, fabric sleeve 102 may be pretreated with one or more chemical compositions. In particular embodiments, one or more chemical compositions may comprise stain protectors or other material protectors, or material scents, such as Scotchgard™ protector, air freshener scents, or insect repellants.

Fabric sleeve 102 may have a plurality of faces corresponding to various sides of a three-dimensional rectangular shape with various features on each of the plurality of faces. In particular embodiments, a first face 102A comprises a planar fabric 104 protruding perpendicular to the first face 102A and parallel to a long axis of the chin-rest 100. The planar fabric 104 may comprise the same material or a different material than the material of fabric sleeve 102. Planar fabric 104 may extend from one continuous piece of fabric from fabric sleeve 102, planar fabric 104 may be two ends of a continuous piece of fabric from fabric sleeve 102, or planar fabric 104 may be an entirely different piece of fabric that is connected to fabric sleeve 102 at the first face 102A.

In particular embodiments, planar fabric 104 may be connected to a fastener 110 by way of another fastener 106, 108. Another fastener 106, 108 may be either a hook strip or a loop strip that fastens to a loop stripe or a hook strip. In particular embodiments, another fastener 106 may be attached to planar fabric 104 and another fastener 108 may be attached to fastener 110. Another fastener 106, 108 attachment to planar fabric 104 and fastener 110 may be permanent, semi-permanent, or removable. In particular embodiments, planar fabric 104 may be directly fastened to fastener 110 without another fastener 106, 108. In particular embodiments, another fastener 106, 108 may be portions of a strip Velcro®.

Fastener 110 comprises a track body adapted to attach to an auto or truck window and the planar fabric 104. In particular embodiments, a track body comprises a u-channel. In particular embodiments, the u-channel may fit various thicknesses of particular windows of a particular automobile or truck. In particular embodiments, the u-channel may fit thicknesses of 1/16" to 1" and be adapted to fit onto particular windows of particular automobiles and trucks may that are about 3 mm to 6 mm (0.11"-0.24"). In particular embodiments, a track body comprises a u-channel comprising transparent polyvinyl chloride (PVC), extruded plexiglass acrylic, polyethylene terephthalate glycol (PETG), aluminum, or another plastic or metal material suitable to sit on a window of an automobile or truck without damaging the glass of the window.

In particular embodiments, fastener 110 comprises first securing mechanism 112 and second securing mechanism 114. In particular embodiments, first securing mechanism 112 and second securing mechanism 114 comprise at least one of felt paper, cork, rubber, a restickable glue, a cured caulking material, a fabric material, or a removable adhesive. In particular embodiments, first securing mechanism 112 and second securing mechanism 114 may be the same material or different material. In particular embodiments, first securing mechanism 112 and second securing mechanism 114 may be attached to fastener 110 by a non-toxic, tacky, all-purpose craft glue.

Figure 2:
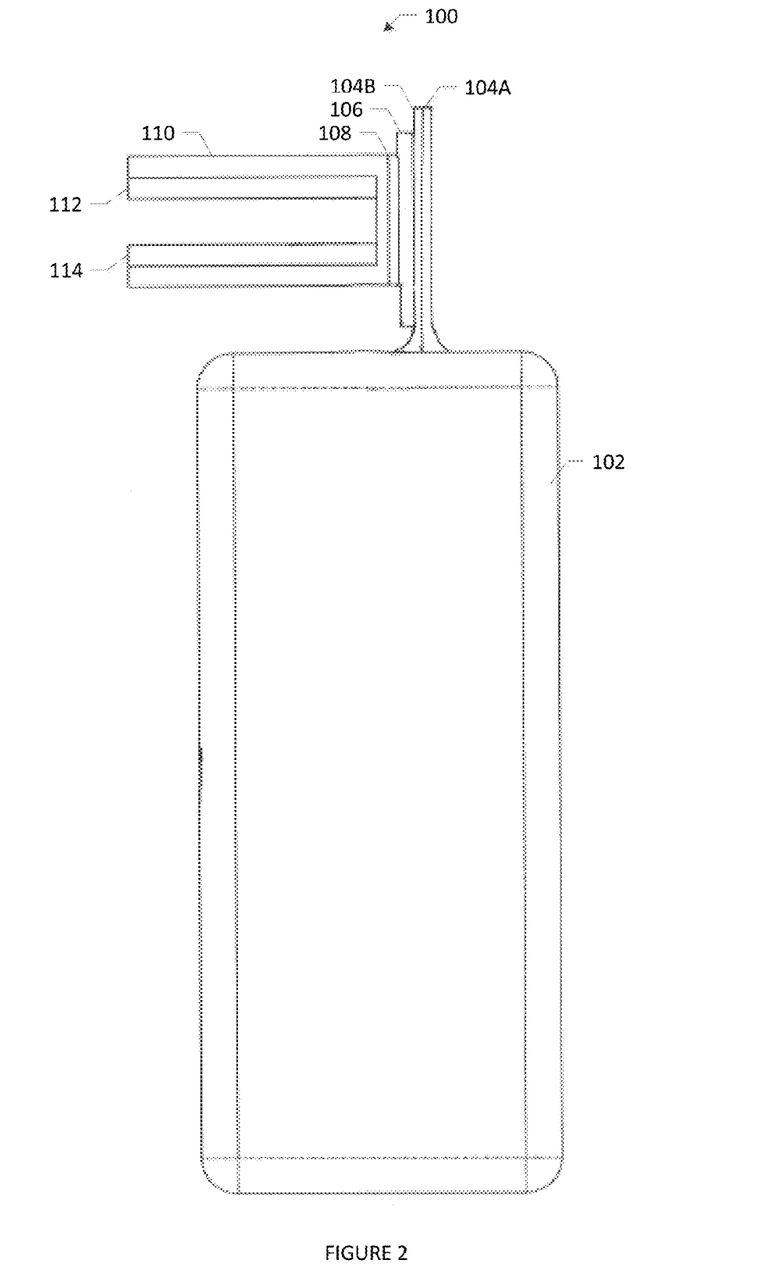
FIG. 2 illustrates an end view of an example embodiment of an auto and truck pet chin-rest.

FIG. 2 illustrates an end view of an example embodiment of an auto and truck pet chin-rest. In particular embodiments, planar fabric 104 may comprise two pieces of planar fabric 104A and 104B that are connected to each other and attached to fabric sleeve 102. In particular embodiments, planar fabric 104 may comprise two ends 104A, 104B of a continuous piece of fabric from fabric sleeve 102.

Figure 3:
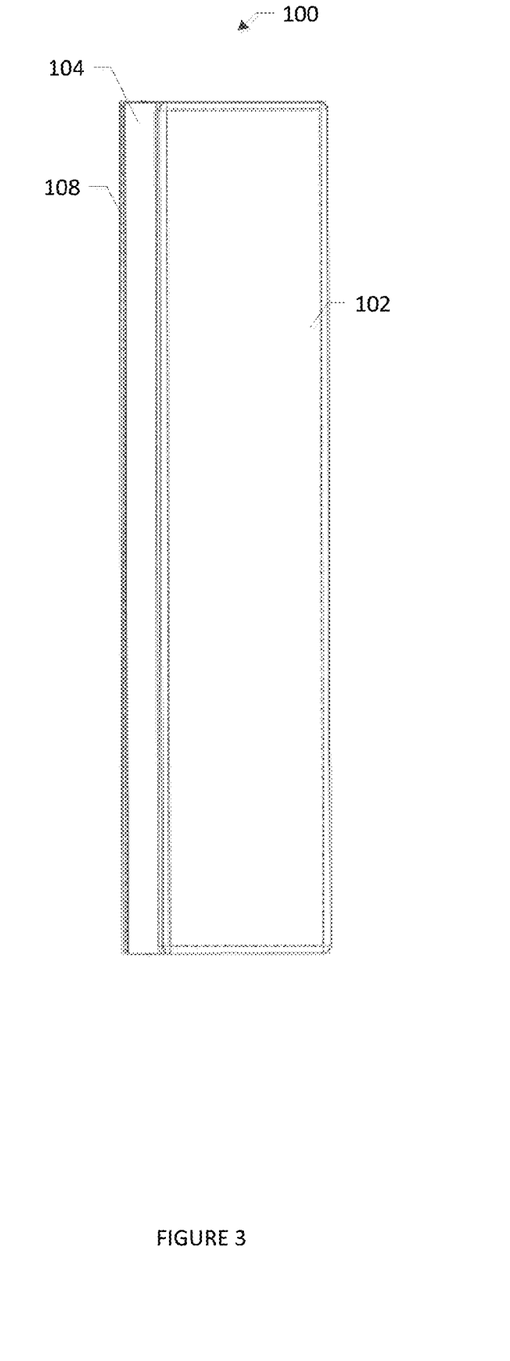
FIG. 3 illustrates a top view of an example embodiment of an auto and truck pet chin-rest.

In particular embodiments, first securing mechanism 112 and second securing mechanism 114 are attached the interior walls of fastener 110 for securing fastener 110 to the top of a window of a particular automobile or truck. Although another fastener 106, 108 is shown in FIG. 2 as having different widths and heights, in particular embodiments, the width, length, and height of another fastener 106, 108 may be the same. FIG. 3 illustrates a top view of an example embodiment of an auto and truck pet chin-rest.

Figure 4A:
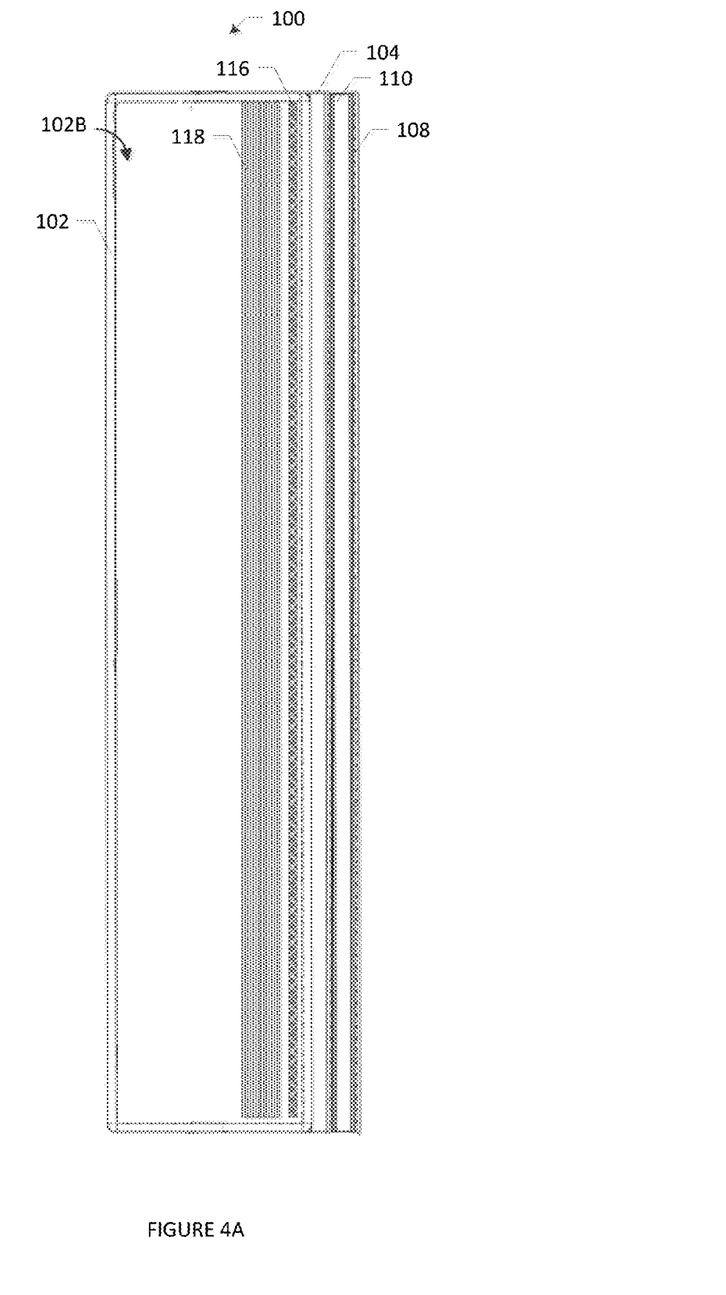
FIG. 4A illustrates a bottom view of an example embodiment of an auto and truck pet chin-rest.

FIG. 4A illustrates a bottom view of an example embodiment of an auto and truck pet chin-rest. In particular embodiments, fabric sleeve 102 comprises a second face 102B that comprises an opening 116 for accessing the interior of fabric sleeve 102 that is parallel to the long axis of the chin-rest 100 and extending the entire length of the second face 102B of chin-rest 100. In particular embodiments, the opening 116 may have a Velcro fastener or a zipper for closing or opening the opening 116.

Velcro strip 118 comprises an example embodiment of a secondary safety mechanism, or a second fastener, to prevent chin-rest 100 from detaching from an automobile or truck window when the automobile or truck is traveling at high speeds.

Figure 4B:
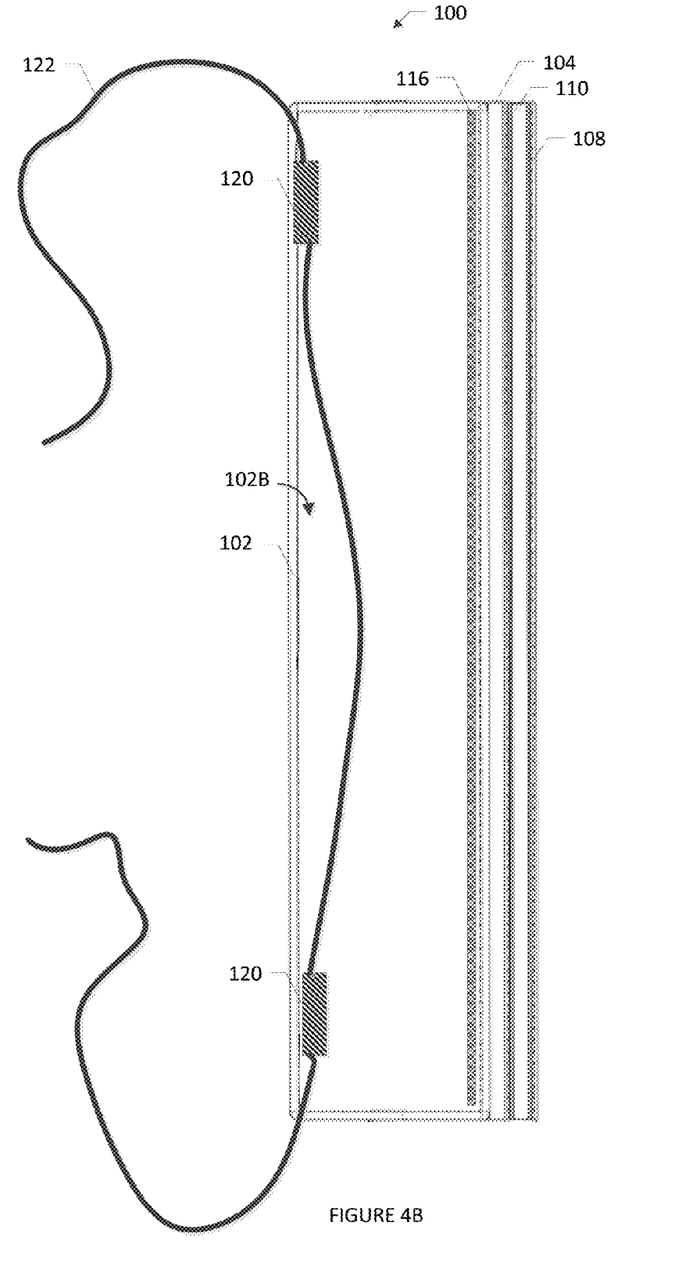
FIG. 4B illustrates a bottom view of another example embodiment of an auto and truck pet chin-rest.

FIG. 4B illustrates a bottom view of another example embodiment of an auto and truck pet chin-rest. The combination of loops 120 and cord 122 comprise another example embodiment of a secondary safety mechanism, or a second fastener, to prevent chin-rest 100 from detaching from an automobile or truck window when the automobile or truck is traveling at high speeds. Loops 120 may be may be made of any of the same or different materials as fabric sleeve 102 described above. Loops 120 may be attached at or near an edge of the second face 102B of fabric sleeve 102. Loops 120 comprise a fabric loop that can accept a cord 122. In particular embodiments, cord 122 comprises a first end, a body, and a second end. In particular embodiments, cord 122 is disposed through loops 120, the first end and the second end extending into an interior of a particular automobile or truck where the first end and the second end join. In particular embodiments, when the first end and second end of cord 122 join in the interior of a particular automobile or truck, they may be drawn together around a handle or other aperture within the particular automobile or truck, thereby securing the chin-rest 100 to the door of the particular automobile or truck.

Figure 5:
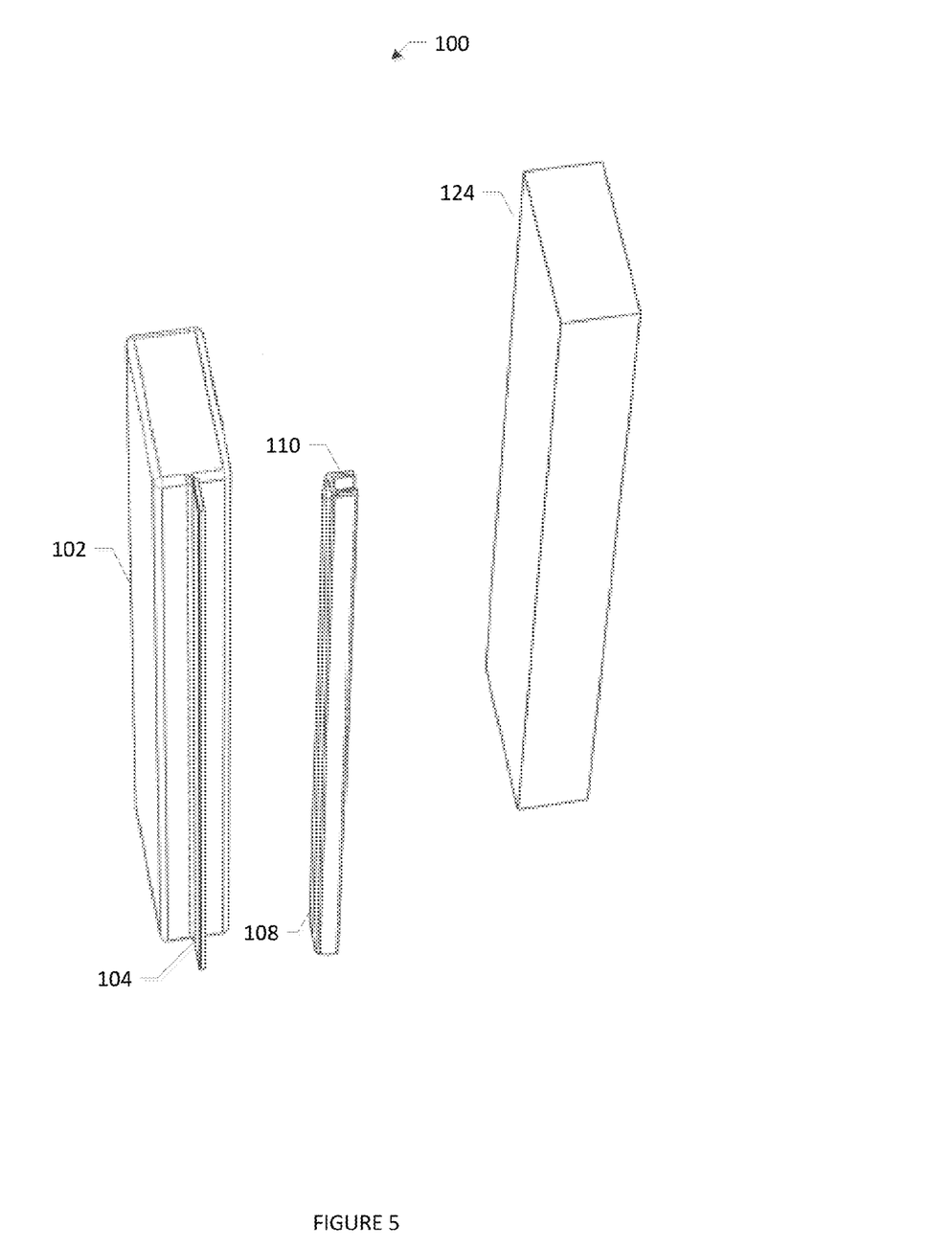
FIG. 5 illustrates an exploded view of an example embodiment of an auto and truck pet chin-rest.

FIG. 5 illustrates an exploded view of an example embodiment of an auto and truck pet chin-rest. In particular embodiments, chin-rest 100 may be soft and pillow-like or firm and pillow-like. Filler material 124 may be positioned within the cavity of fabric sleeve 102. In particular embodiments, filler material 124 may comprise a rectangular foam pillow that is approximately the same dimensions as the cavity of the fabric sleeve 102. In particular embodiments, filler material 124 may comprise a plurality of loose pieces of viscoelastic filler material enclosed within the rectangular cavity of the fabric sleeve 102. In particular embodiments, filler material 124 may comprise any one or more of the following materials, including polyester, polyester pellets, microbeads, beanbag filler, foam, down and other feathers, wool, horsehair, natural shredded rubber, buckwheat, millet, flaxseed, lavender, silk, hemp, cedar chips, herbs, memory foam, beans, orthopedic foams and any other kind of filler that could fill the volume of the cavity within fabric sleeve 102.

Figure 6:
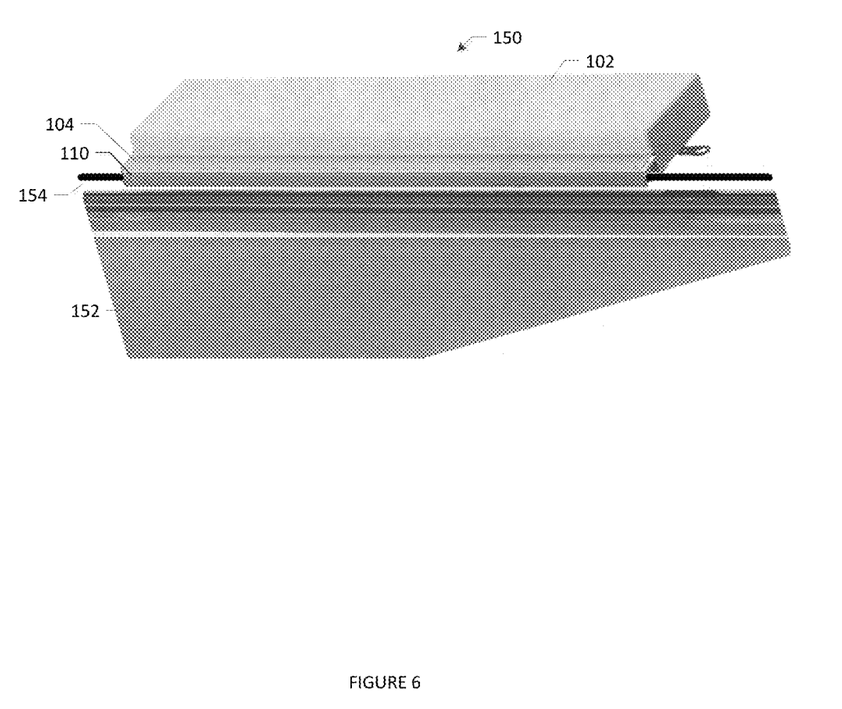
FIG. 6 illustrates an example embodiment of an installed auto and truck pet chin-rest.

FIG. 6 illustrates an example embodiment of an installed auto and truck pet chin-rest. In particular embodiments, chin-rest 150 is positioned on a lowered window 154 of a particular automobile or truck. An exterior of an automobile or truck door 152 is illustrated for purposes of showing an installed chin-rest 150. The fabric sleeve 102 is facing the interior of the particular automobile or truck door illustrated in FIG. 6. The first fastener 110 is secured to the planar fabric 104 and securely locked into place atop window 154. In particular embodiments, window 154 protrudes approximately ¼" above the automobile or truck door so that the first fastener 110 is securely locked into place and fabric sleeve 102 is resting on an interior portion of an automobile or truck door. In particular embodiments, a window motor of window 154 may be deactivated to prevent window 154 from raising or lowering while chin-rest 150 is securely positioned atop window 154.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The invention claimed is:
1. An auto and a truck window pillow comprising:
   a fabric sleeve defining a cavity, the fabric sleeve comprising a planar fabric protruding perpendicular to a first face of the fabric sleeve and parallel to a longitudinal axis of the fabric sleeve and a second face of the fabric sleeve including an opening parallel to the longitudinal axis of the cavity fabric sleeve;

filler material positioned within the cavity; and a track body adapted to attach to the auto or truck window and the planar fabric;

whereby a dog can rest its chin on the window pillow.

2. The auto and truck window pillow of claim 1, the second face further comprising a secondary safety mechanism comprising a hook strip and a loop strip, the hook strip operatively attached to the second face and parallel to the longitudinal axis of the fabric sleeve, the loop strip adapted to attach to a door of a car.

3. The auto and truck window pillow of claim 1, the second face further comprising a secondary safety mechanism comprising a first loop, a second loop, and a cord comprising a first end, a body, and a second end, the cord disposed within the first loop and the second loop and extending toward an interior car door handle where the first end and the second end join to secure the pillow in place.

4. The auto and truck pillow of claim 1, wherein the opening comprising a zipper.

5. The auto and truck pillow of claim 1, wherein the fabric sleeve comprising a durable, soft, and stain resistant material.

6. The auto and truck pillow of claim 1, wherein the planar fabric is attached to a loop strip extending the longitudinal axis of the planar fabric, and the track body further comprising a hook strip attached to the track body, whereby the hook strip and the loop strip connect the track body and the planar fabric.

7. The auto and truck pillow of claim 1, wherein the track body adapted to attach to the auto or truck window and the planar fabric, comprising:

a channel track;

a first track body securing mechanism in a first inside portion of the channel track parallel to a longitudinal axis of the channel track and extending a length of the channel track; and a second track body securing mechanism in a second inside portion of the channel track parallel to the longitudinal axis of the channel track and extending the length of the channel track, wherein the first track body securing mechanism and the second track body securing mechanism securely attach the pillow to the auto or truck window.

8. The auto and truck pillow of claim 1, wherein the filler material comprising a memory foam pillow.

9. The auto and truck pillow of claim 1, wherein the planar fabric is attached to a hook strip extending the long axis of the planar fabric, and the track body further comprising a loop strip attached to the track body, whereby the hook strip and the loop strip connect the track body and the planar fabric.

10. The auto and truck window pillow of claim 1, the second face further comprising a secondary safety mechanism comprising a hook strip and a loop strip, the loop strip operatively attached to the second face and parallel to the longitudinal axis of the fabric sleeve, the hook strip adapted to attach to a door of a car.

* * * * *